United States Patent [19]

Kawashima et al.

[11] Patent Number: 4,726,013
[45] Date of Patent: Feb. 16, 1988

[54] TIME DIVISION MULTIPLEX TELECOMMUNICATIONS SYSTEM AND METHOD FOR A KEY TELEPHONE SYSTEM OR THE LIKE

[75] Inventors: Masayuki Kawashima, Tokyo; Hideharu Omori, Hino, both of Japan

[73] Assignee: Iwatsu Electric Co., Ltd., Tokyo, Japan

[21] Appl. No.: 820,256

[22] Filed: Jan. 17, 1986

[30] Foreign Application Priority Data

Jan. 28, 1985 [JP] Japan ................................ 60-14010
Dec. 3, 1985 [JP] Japan ................................ 60-271896

[51] Int. Cl.$^4$ ............................. H04J 3/08; H04J 3/06
[52] U.S. Cl. ........................................ 370/55; 370/100
[58] Field of Search ................. 370/55, 79, 85, 86, 370/87, 100, 82

[56] References Cited

U.S. PATENT DOCUMENTS

| | | | |
|---|---|---|---|
| 3,647,976 | 3/1972 | Moses | 370/55 X |
| 3,751,595 | 8/1973 | Moses | 370/55 X |
| 4,354,054 | 10/1982 | Bellisio | 370/86 X |
| 4,631,721 | 12/1986 | Ono et al. | 370/85 |

FOREIGN PATENT DOCUMENTS 0069954 4/1982 Japan ..................................... 370/86

Primary Examiner—Douglas W. Olms
Assistant Examiner—Melvin Marcelo
Attorney, Agent, or Firm—Woodcock Washburn Kurtz Mackiewicz & Norris

[57] ABSTRACT

A time division multiplex telecommunications system is disclosed as adapted for a key telephone system providing for intercommunication between any two of a series of key telephone sets in cascade connection to a switching control circuit, possibly with facilities for association with the nationwide telephone network. The control circuit receives from the tandem connection of telephones an outgoing data signal of time division multiplex frame format having a succession of frames each comprising a frame sync signal and channels of outgoing data from the respective telephones. Rearranging the channels of data in the received outgoing data signal, the control circuits delivers back to the successive telephones an incoming data signal of similar frame format. Each telephone is equipped for rearrangement of the frame sync signal and data channels of the incoming and outgoing data signals, with the result that all the telephones can be of the same circuit configuration.

9 Claims, 9 Drawing Figures

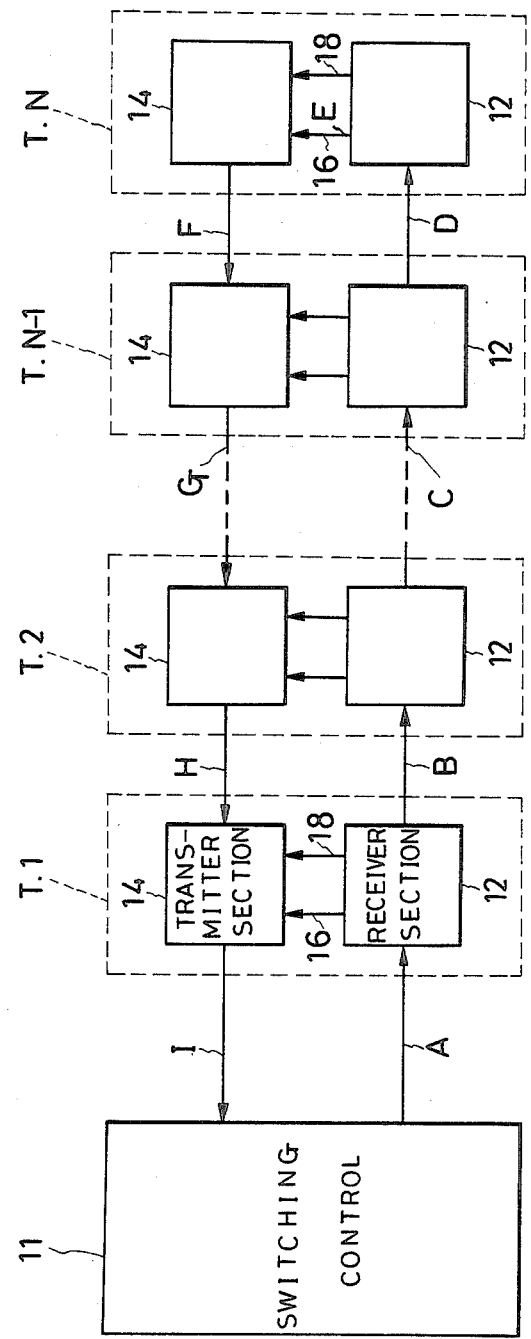

TIME DIVISION MULTIPLEX TELECOMMUNICATIONS SYSTEM AND METHOD FOR A KEY TELEPHONE SYSTEM OR THE LIKE

BACKGROUND OF THE INVENTION

Our invention is generally in the art of data transmission or telecommunication and pertains more particularly to a novel system for, and method of, telecommunication by the time division multiplexing technology. Our invention finds a typical application in a key telephone system which provides direct intercommunication between telephones on the same premises, possibly with facilities for association with the nationwide telephone network.

In a typical key telephone system, as heretofore configured, a plurality or multiplicity of key telephones or terminal units have been star connected to a switching control circuit. We object to this star connection of the key telephones because each path connecting one telephone to the switching control circuit can convey but one channel of messages or data. This requires just as many transmission paths as the number of the star connected telephones. The wiring and associated connections for such prior art key telephone system have thus been very complex and costly.

SUMMARY OF THE INVENTION

We have hereby discovered how to simplify the configuration of a key telephone system or other equivalent telecommunications systems without making complex the construction of the key telephones or other equivalent terminal units.

According to our invention, summarized in its perhaps broadest aspect, there is provided a time division multiplex telecommunications method for the transmission of data to at least first and second terminal stations in tandem connection with each other. The method comprises transmitting to the first terminal station a data signal of time division multiplex frame format having a succession of frames of a frame sync signal and at least first and second channels of data arranged in predetermined time relationship to one another. The first terminal station accepts, as by extracting, the first channel of data contained in each frame of the input data signal. Further, at this first terminal station, the time relationship between the frame sync signal and the second channel of data in each frame of the input data signal is rearranged to provide a second data signal, also of the time division multiplex frame format, wherein the time relationship between the frame sync signal and the second channel of data in each frame is the same as the time relationship between the frame sync signal and the first channel of data in each frame of the first recited data signal which has been transmitted to the first terminal station. This second data signal is transmitted from the first to the second terminal station, where the second channel of data contained in each frame of the second data signal is extracted or otherwise accepted.

Stated in another aspect thereof, our invention provides a time division multiplex telecommunications system for use in the practice of the above summarized method, comprising a source of a data signal of time division multiplex frame format having a succession of frames of a frame sync signal and at least first and second channels of data arranged in predetermined time relationship to one another. In tandem or cascade connection with the source are a first and second terminal units, at the first and second terminal stations, for inputting the first and second channels of data, respectively. The first terminal unit comprises means for accepting the first channel of data contained in each frame of the input data signal from the source, and means for rearranging the time relationship between the frame sync signal and the second channel of data in each frame of the input data signal and for putting out a second data signal wherein the time relationship between the frame sync signal and the second channel of data in each frame is the same as the time relationship between the frame sync signal and the first channel of data in each frame of the first recited data signal supplied from the source. The second terminal unit comprises means for accepting the second channel of data contained in each frame of the second data signal from the first terminal unit.

Of course, not two but any desired number of terminal units can be interconnected in series within the broad teaching of our invention. As summarized above, each such terminal unit extracts from the input data signal only the channel of data preassigned thereto and puts out a new data signal comprising the remaining channels of data and the frame sync signal. The arrangement of the remaining channels of data and the frame sync signal in each frame of the new data signal is so determined as to enable the next terminal unit to extract the preassigned channel of data therefrom in the same manner as the preceding terminal unit. Thus, as one of the most pronounced advantages of our invention over the noted prior art, any required number of channels of data can be transmitted over a common path interconnecting as many, or a smaller, number of terminal units of exactly the same circuit configuration. The cascade connection of the terminal units is much simpler, less expensive, and easier of initial installation and maintenance than the conventional star connection.

Preferably, each terminal unit is equipped not only for data reception but also for data transmission, as in a key telephone system disclosed subsequently by way of a preferable embodiment of our invention, in order to provide for intercommunication between any two of the cascaded terminal units or telephone sets. The transmission of data from each terminal unit is also well calculated to permit the use of any desired number of cascaded terminal units of the same circuit configuration.

The above and other features and advantages of our invention and the manner of realizing them will become more apparent, and the invention itself will best be understood, from a study of the following description and appended claims, with reference had to the attached drawings showing the preferred embodiments of our invention.

BRIEF DESCRIPTION OF THE DRAWINGS

FIG. 1 is a block diagram of the key telephone system embodying the principles of our invention;

DESCRIPTION OF THE PREFERRED EMBODIMENTS

Outline

Figure 2A:
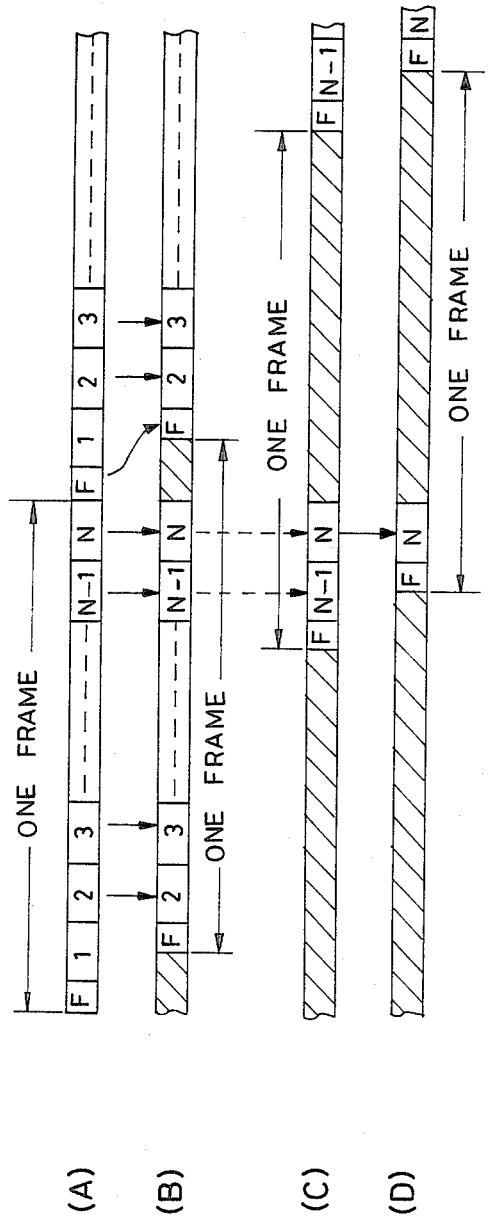
FIG. 2A is a timing diagram showing an incoming data signal of time division multiplex form as appearing in the various parts of the key telephone system of FIG. 1.
Figure 2B:
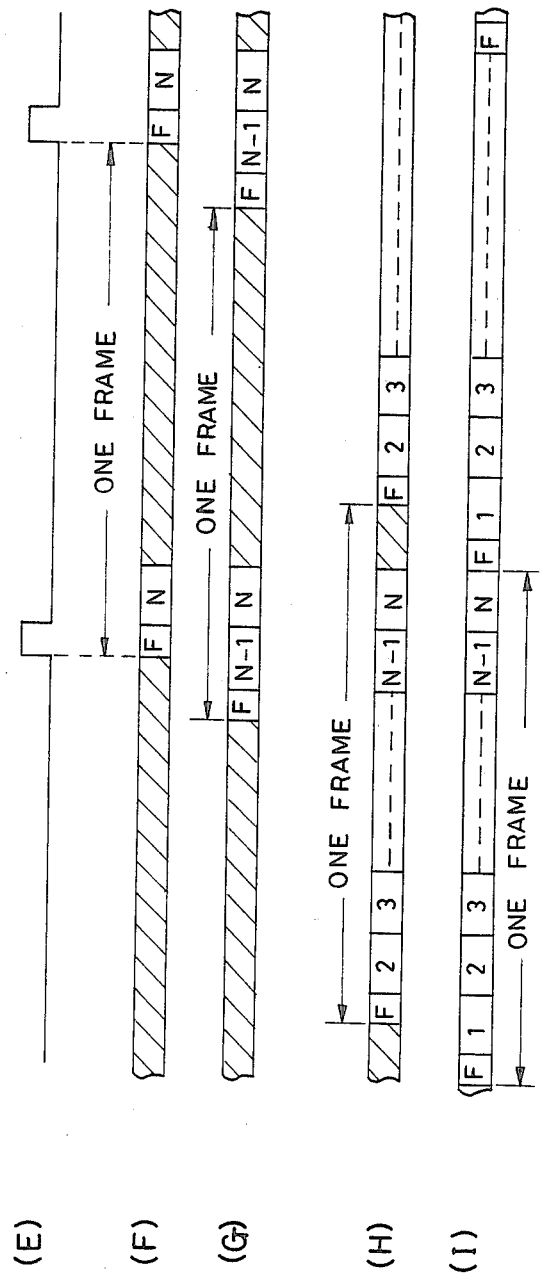
FIG. 2B is a similar timing diagram showing principally an outgoing data signal of time division multiplex form as appearing in the various parts of the key telephone system of FIG. 1.

We will now describe our invention as in terms of the key telephone system of FIG. 1 as an example of time division multiplex telecommunications system in accordance with our invention. During the description of this exemplified key telephone system will refer also to the timing diagrams of FIGS. 2A and 2B, showing the signals appearing in the various parts of the system. The signals designated (A) through (D) in FIG. 2A appear in those parts of the FIG. 1 system which are indicated by the same capitals, and the signals (E) through (I) in FIG. 2B also appear in the correspondingly indicated parts of the FIG. 1 system.

The key telephone system of FIG. 1 comprises N terminal units or key telephone sets T.1, T.2, ... T.N−1 and T.N connected in tandem or cascade to a digital switching control circuit 10. Despite the showing of FIG. 1, N can be any number not less than two. In its simplest form, therefore, the telecommunications system of our invention may comprise only two terminal units. All the terminal units T.1 through T.N are of the same circuit configuration, each comprising a receiver section 12 and a transmitter section 14. The receiver sections 12 of all the terminal units are interconnected, and the receiver section of the first terminal unit T.1 is connected to the switching control circuit 10. The transmitter sections 14 of all the terminal units are likewise interconnected, and the transmitter section of the first terminal unit T.1 is connected to the switching control circuit 10. Further, in this particular embodiment, the receiver and transmitter sections of each terminal unit are interconnected by two signal lines 16 and 18. The switching control circuit 10 may, or may not, be associated with the nationwide telephone system, besides providing for intercommunication between any two of the cascaded terminal units T.1 through T.N.

At (A) in FIG. 2A is shown an incoming data signal of time division multiplex frame format fed from the switching control circuit 10 to the the receiver section 12 of the first terminal unit T.1 for data transmission to this and subsequent terminal units T.1 through T.N. The incoming data signal has a succession of frames each comprising a frame field F, assigned to a frame sync signal, and first to N'th data fields 1 through N assigned to the N channels of data associated with the respective terminal units. The frame field F and data fields 1 through N are arranged in predetermined time relationship to one another in each frame of the incoming data signal, with the frame field foremost and the data fields disposed sequentially thereafter.

Inputting this incoming data signal from the switching control circuit 10, the receiver section 12 of the first terminal unit T.1 extracts the first channel of data from the associated data field 1. Further the receiver section 12 of the first terminal unit T.1 recreates an incoming data signal of new frame format depicted at (B) in FIG. 2A, for delivery to the receiver section 12 of the second terminal unit T.2. It will be seen that this new, or second, incoming data signal does not contain the first channel of data; instead, the frame field has been shifted to a time position immediately before the second data field 2 in each frame. In other words, the time relationship between the frame field F and the second data field 2 in each frame of this second incoming data signal is the same as the time relationship between the frame field F and the first data field 1 in each frame of the first recited incoming data signal which has been fed from switching control circuit 10 to first terminal unit T.1. As indicated by hatching at (B) in FIG. 2A, a region of no data has thus been created between the N'th data field N of each frame and the frame field F of the next frame.

On receiving the above second incoming data signal from the receiver section 12 of the first terminal unit T.1, the receiver section 12 of the second terminal unit T.2 extracts the second channel of data from the second data field 2 of each frame. The second terminal unit T.2 also recreates an incoming data signal of new frame format wherein the third data field 3 immediately follows the frame field F of each frame.

As the successive terminal units repeat the foregoing method of signal reception and transmission, it will be understood that the N−1'th terminal unit T.N−1 inputs an incoming data signal given at (C) in FIG. 2A. Each frame of this incoming data signal fed to the N−1'th terminal unit T.N−1 comprises the data field F, the N−1'th data field N−1 and the N'th data field N, in that order. The N−1'th terminal unit T.N−1 likewise extracts the data from the N−1'th data field N−1 of each frame and recreates an incoming data signal of new frame format plotted at (D) in FIG. 2A, each frame of which has only the frame field F and, immediately thereafter, the N'th data field N. The N'th or final terminal unit T.N extracts the N'th channel of data from the N'th data field N of each frame of the FIG. 2A(D) signal.

The foregoing will have made clear that the method of data reception by the N terminal units T.1 through T.N is exactly the same, with each terminal unit extracting its own channel of data from the incoming data signal and recreating an incoming data signal of new frame format for the next terminal unit. Accordingly, the receiver sections 12 of all the terminal units can be of the same circuit configuration and can be simply cascaded to the control circuit 10 for the reception of the particular channel of data addressed to each terminal unit.

It is to be noted that, contrary to the showings of FIGS. 1 and 2A, the number of cascaded terminal units need not be equal to the number of data channels included in each frame of the time division multiplex data signal. We recommend that the number N of data channels in each frame of the data signal be made greater than the number (M) of the cascaded terminal units that are expected to be installed. The additional unused data channels will make it easier to install, as the need arises, additional terminal units mereby by connecting these additional units in series with the existing terminal units.

FIG. 2B is explanatory of the operation of the key telephone system of FIG. 1 for data transmission from each of the terminal units T.1 through T.N to the switching control circuit 10 and thence back to any other one of the terminal units or on to the nationwide telephone network. The transmitter section 14 of each terminal unit receives from the associated receiver section 12 a series of frame sync pulses, shown at (E) in FIG. 2(B), and a series of clock pulses, not shown, by way of the lines 16 and 18 of FIG. 1. In response to these frame sync pulses and clock pulses, the transmitter section 14 of each terminal unit creates, or recreates, an outgoing data signal of time division multiplex frame format as hereinafter described in connection with (F) to (I) in FIG. 2B.

First of all, at the N'th terminal unit T.N, the outgoing data signal is formed as at (F) in FIG. 2B, having a succession of frames bounded by the frame sync pulses. Each frame of the outgoing data signal as created by the N'th terminal unit T.N is composed of a frame field F, assigned to an outgoing frame sync signal, and a data field N assigned to the N'th channel of outgoing data which of course is generated by the N'th terminal unit. The N'th terminal unit transmitter section 14 delivers this outgoing data signal to the transmitter section 14 of the next terminal unit T.N−1 closer to the switching control circuit 10.

In response to this outgoing data signal the N−1'th terminal unit transmitter section 14 recreates an outgoing data signal of new frame format shown at (G) in FIG. 2B. The new frame format is such that the frame field F has been shifted to the left, as viewed in FIG. 2B, for the insertion of a new data field N−1 between this frame field and the existing data field N. The new data field N−1 contains the N−1'th channel of data generated by the N−1'th terminal unit itself. Essentially, therefore, the time relationship between the outgoing frame sync signal and the N−1'th channel of data in each frame of the recreated outgoing data signal is the same as the time relationship between the outgoing frame sync signal and the N'th channel of data in each frame of the outgoing data signal fed from the N'th terminal unit T.N.

As indicated at (H) in FIG. 2B, the second terminal unit T.2 likewise adds the second channel of data to the received outgoing data signal, recreating an outgoing data signal of new frame format wherein the second channel of data occupies the second data field 2 formed immediately after the frame field F in each frame.

Then, at first or final terminal unit T.1 closest to the switching control circuit 10, an outgoing data signal of new frame format is also recreated as at (I) in FIG. 2B, wherein the first data field 1 for the first channel of data intervenes between the frame field F and the second data field 2 in each frame. Thus has been completed the outgoing data signal, ready for delivery to the switching control circuit 10, having a repetition of frames each composed of a sequential arrangement of the outgoing frame sync signal and first to N'th channels of data. The hatched regions in FIG. 2B denote the absence of outgoing data. Of course, if any one or more of the terminal units T.1 through T.N generates no data, the corresponding data field or fields of the outgoing data signal will contain no data.

It is now clear that the transmitter sections 14 of the terminal units T.1 through T.N all operate in the same manner for the reception of the outgoing data signal from the preceding terminal unit and the recreation of the outgoing data signal of new frame format. All these transmitter sections 14 can also be of like circuit configuration.

Inputting the outgoing data signal of FIG. 2B(I), the switching control circuit 10 rearranges the data channels as instructed separately and puts out the incoming data signal of FIG. 2A(A), containing the rearranged data channels, to the receiver sections 12 of the successive terminal units, thereby enabling intercommunication between any two of such terminal units. As has been mentioned, the switching control circuit 10 may also send the outgoing data out to any of several central office lines. The switching operation of the control circuit 10 will be easier, and the associated circuitry simpler, as the incoming data signal of FIG. 2A(A) and the outgoing data signal of FIG. 2B(I) are of the same format.

RECEIVER SECTION OF EACH TERMINAL UNIT

Figure 3:
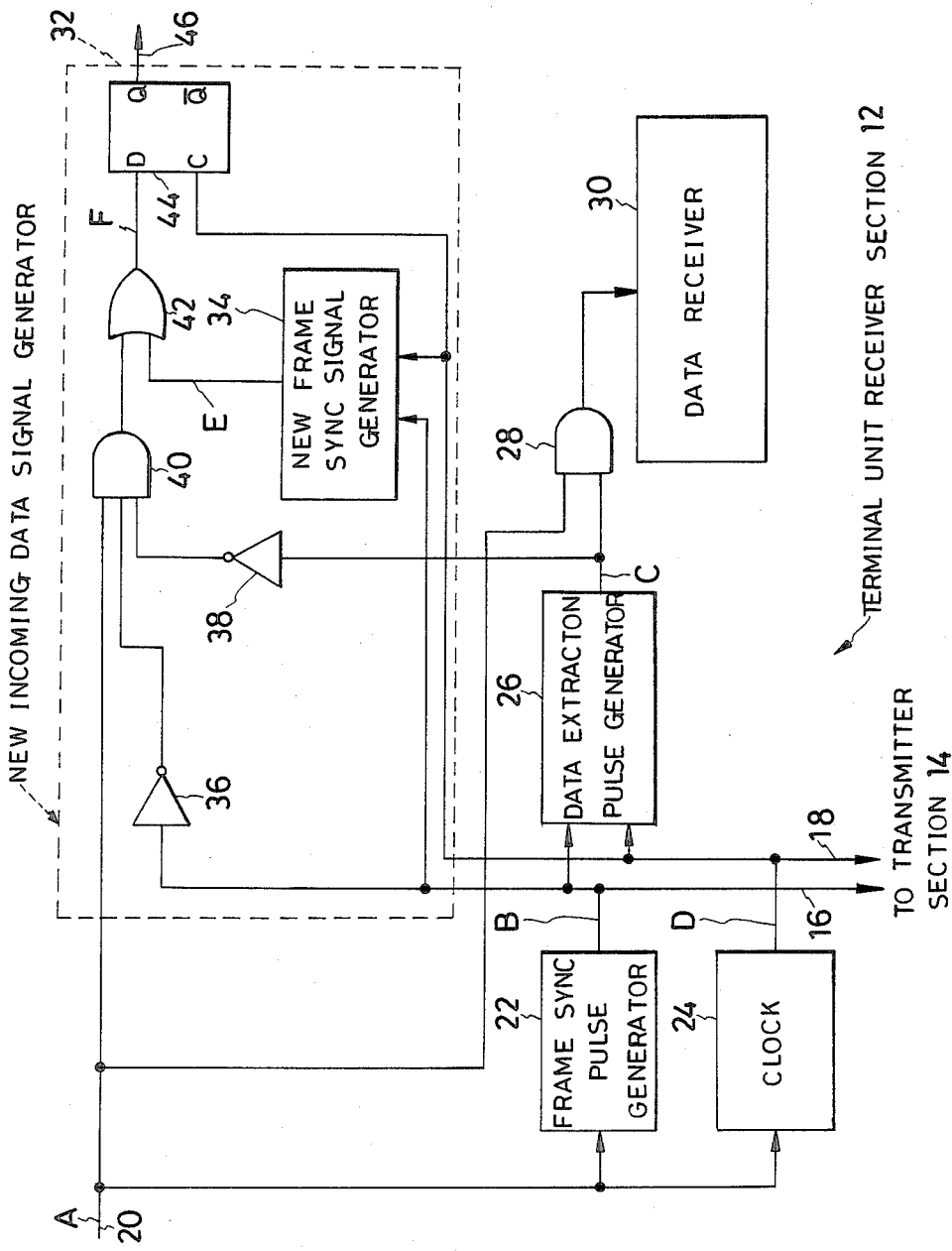
FIG. 3 is a block diagram showing in more detail the receiver section of each terminal unit (key telephone) of the FIG. 1 system.
Figure 4:
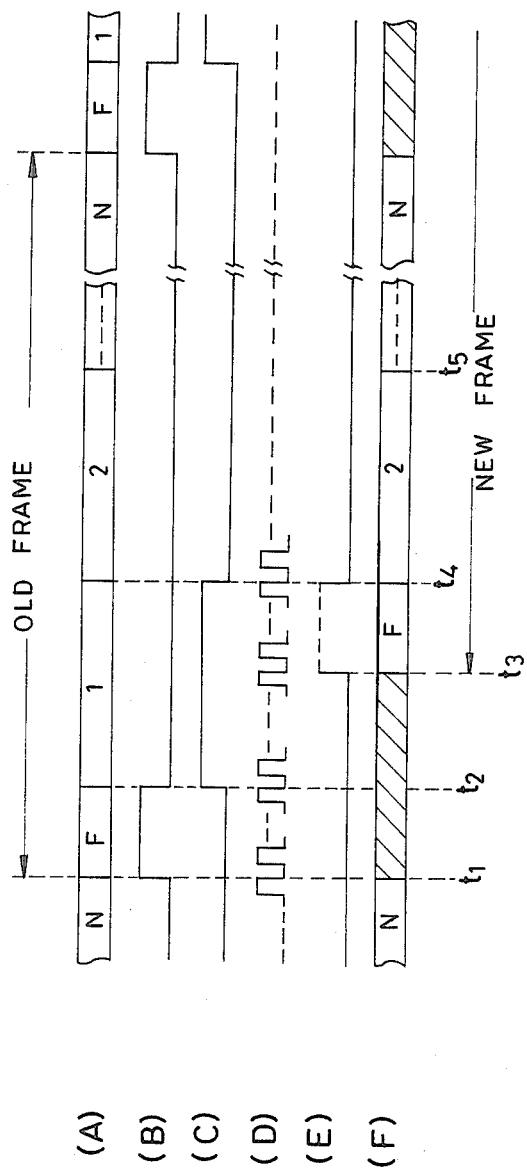
FIG. 4 is a timing diagram showing the signals appearing in the various parts of the receiver section of FIG. 3.

We have shown in FIG. 3 a preferred form of the receiver section 12 of each of the terminal units T.1 through T.N. FIG. 4 is a representation of signals, (A) through (F), appearing in the correspondingly designated parts of the receiver section 12 of FIG. 3.

At 20 in FIG. 3 is shown the input path connected to the switching control circuit 10, or to the receiver section 12 of the preceding terminal unit closer to the switching control circuit, for the reception of the incoming data signal set forth with particular reference to FIG. 2A. Let us assume that the receiver section 12 of FIG. 3 is that of the first termiminal unit T.1 connected directly to the switching control circuit 10. Then the incoming data signal fed to this particular receiver section is of the format depicted at (A) in FIG. 4, which is the same as that shown at (A) in FIG. 2A.

Connected to the input path 20 is, first of all, a frame sync pulse generator circuit 22 for generating frame sync pulses of FIG. 4(B) in response to the frame sync signal contained in the incoming data signal. The frame sync pulse generator circuit 22 extracts the frame sync signal from the frame field F, as from moment t1 to moment t2 in FIG. 4, in each frame of the incoming data signal of FIG. 4(A). The frame sync pulses are therefore in synchronism with the frame fields F of the incoming data signal. We assume that, in this particular embodiment, the frame sync signal contained in the time division multiplex data signal consists of a repetition of 32 different binary numbers of five bits, from "00000" to "11111". Since the 32 binary numbers occur periodically, from "00000" to "00001" and finally to "11111", the frame sync pulse generator circuit 22 takes advantage of that periodicity to generate the frame sync pulses in synchronism with the frame fields F of the incoming data signal.

Also connected to the input path 20 is a clock 24 for generating the clock pulses of FIG. 4(D). If the data transmitted in this key telephone system have been coded by coded mark inversion (CMI), as is now assumed, then the data contained in the data fields of the incoming data signal include a clock component. The clock 24 responds to this clock component to generate the clock pulses. The data in the data fields of the incoming data signal are a combination of, for example, message data and control data.

The frame sync pulse generator circuit 22 and clock 24 are both connected to a data extraction pulse generator circuit 26, besides being connected to the transmitter section 14 of the same terminal unit by way of the aforesaid lines 16 and 18. The data extraction pulse generator circuit 26 generates and puts out data extraction pulses, as at (C) in FIG. 4, each lasting as from moment t2 to moment t4 in FIG. 4 and so synchronized with that data field in each frame of the incoming data signal which is preassigned to the terminal unit under consideration. Since the terminal unit now under consideration is the first terminal unit T.1, each data extraction pulse of FIG. 4(C) is shown synchronized with the first data field 1 of the incoming data signal. The data extraction pulse generator circuit 26 is, in fact, a counter, starting the production of a pulse upon extinction of each frame sync pulse of FIG. 4(B) and terminating the pulse production upon counting the clock pulses up to a predetermined number corresponding to the duration of one data field.

The data extraction pulse generator circuit 26 is connected to one of the two inputs of a data extraction AND gate 28, the other input of which is connected to the input path 20. The two inputs to this AND gate 28 are therefore as represented at (A) and (C) in FIG. 4, so that the AND gate 28 functions to extract the data from the first data field 1 in each frame of the incoming data signal. It is self evident that, in the receiver section of each of the other terminal units T.2 through T.N, data is similarly extracted from that data field in each frame of the incoming data signal which is preassigned to the particular terminal unit.

The data extraction AND gate 28 has its output connected to a data receiver circuit 30. Typically comprising a digital to analog converter, telephone receiver circuit, control circuit, etc., all not shown, the data receiver circuit 30 processes the extracted data as required.

Also included in the receiver section 12 of each terminal unit is a new incoming data signal generator circuit, shown enclosed in the dashed outline and generally designated 32, for recreating an incoming data signal of new frame format given at (F) in FIG. 4. The new incoming data signal generator circuit 32 is a combination of a new frame sync signal generator circuit 34, two inverters or NOT circuits 36 and 38, an AND gate 40, an OR gate 42, and a D flip flop 44. We will discuss in more detail these individual components of the new incoming data signal generator circuit 32, with reference directed also to FIGS. 3 and 4.

The new frame sync signal generator circuit 34 has two inputs connected respectively to the frame sync pulse generator circuit 22 and to the clock 24 for generating a new frame sync signal, for use in the new incoming data signal to be generated, in substitution for the old frame sync signal which has been contained in the incoming data signal received by the receiver section 12 of the terminal unit under consideration. The new frame sync signal generator circuit 34 puts out the new frame sync signal, given at (E) in FIG. 4, at the moment t3 which is one data field later than the moment t1 when a frame sync pulse of FIG. 4(B) rises. For the determination of this signal production timing, the new frame sync signal generator circuit 34 counts the incoming clock pulses up to a predetermined number corresponding to the duration of one data field. A counter, not shown, is included in the new frame sync signal generator circuit 34, enabling the same to put out the new frame sync signal of the same five bit binary number (selected from among such numbers ranging from "00000" to "11111") as that of the frame sync signal that has been contained in the first frame field F of the incoming data signal of FIG. 4(A).

The new frame sync signal thus generated, indicated by the dashed line at (E) in FIG. 4 for illustrative convenience, is to occupy the frame field F of the new incoming data signal shown at (F) in FIG. 4. Therefore, the frame field F of the new incoming data signal is delayed by one data field from that of the old incoming data signal of FIG. 4(A) which has been received by this terminal unit.

The AND gate 40 has three inputs, the first connected to the input path 20, the second to the frame sync pulse generator circuit 22 via the inverter 36, and the third to the data extraction pulse generator circuit 26 via the inverter 38. Accordingly, the AND gate 40 serves as a data removal circuit, removing from the old incoming data signal the data of the channel preassigned to the terminal unit under consideration, as well as the old frame sync signal. Since we have assumed that this new incoming data signal generator 32 is that of the first terminal unit T.1, the AND gate 40 removes the first channel of data, as well as the frame sync signal, from the old incoming data signal. The output from the AND gate 40 is therefore the time division multiplexing of the second to N'th channels of data.

Having two inputs connected to the AND gate 20 and the new frame sync signal generator circuit 34, the OR gate 42 serves as an addition circuit, adding the new frame sync signal to the second to N'th channels of data for the provision of the desired new incoming data signal represented at (F) in FIG. 4. In each frame of this new incoming data signal, the frame field F containing the new frame sync signal lies immediately before the data field 2 containing the second channel of data and lasting from moment t4 to moment t5. The time relationship between the frame field and the second channel data field in each frame of the new incoming data signal is the same as the time relationship between the frame field and the first channel data field 1 in each frame of the old incoming data signal. The hatchings in the new incoming data signal of FIG. 4(F) indicate no data regions created by the removal of the first channel of data from the old incoming data signal.

We have employed the D flip flop 44 as a buffer at the output stage of the new incoming data signal generator circuit 32. The flip flop 44 has a data input D connected to the OR gate 42, a clock input C connected to the clock 24, and a Q output connected to an output path 46 leading to the receiver section 12 of the second terminal unit T.2.

The foregoing constructional and operational description of the receiver section 12 of the first terminal unit T.1 substantially applies to the receiver section of each of the terminal units T.2 through T.N. It is therefore apparent that each terminal unit inoputs the incoming data signal from the preceding unit closer to the switching control circuit 10, extracts from the incoming data signal the channel of data preassigned thereto, and recreates an incoming data signal of new frame format for delivery to the next terminal unit.

Transmitter Section of Each Terminal Unit

Figure 5:
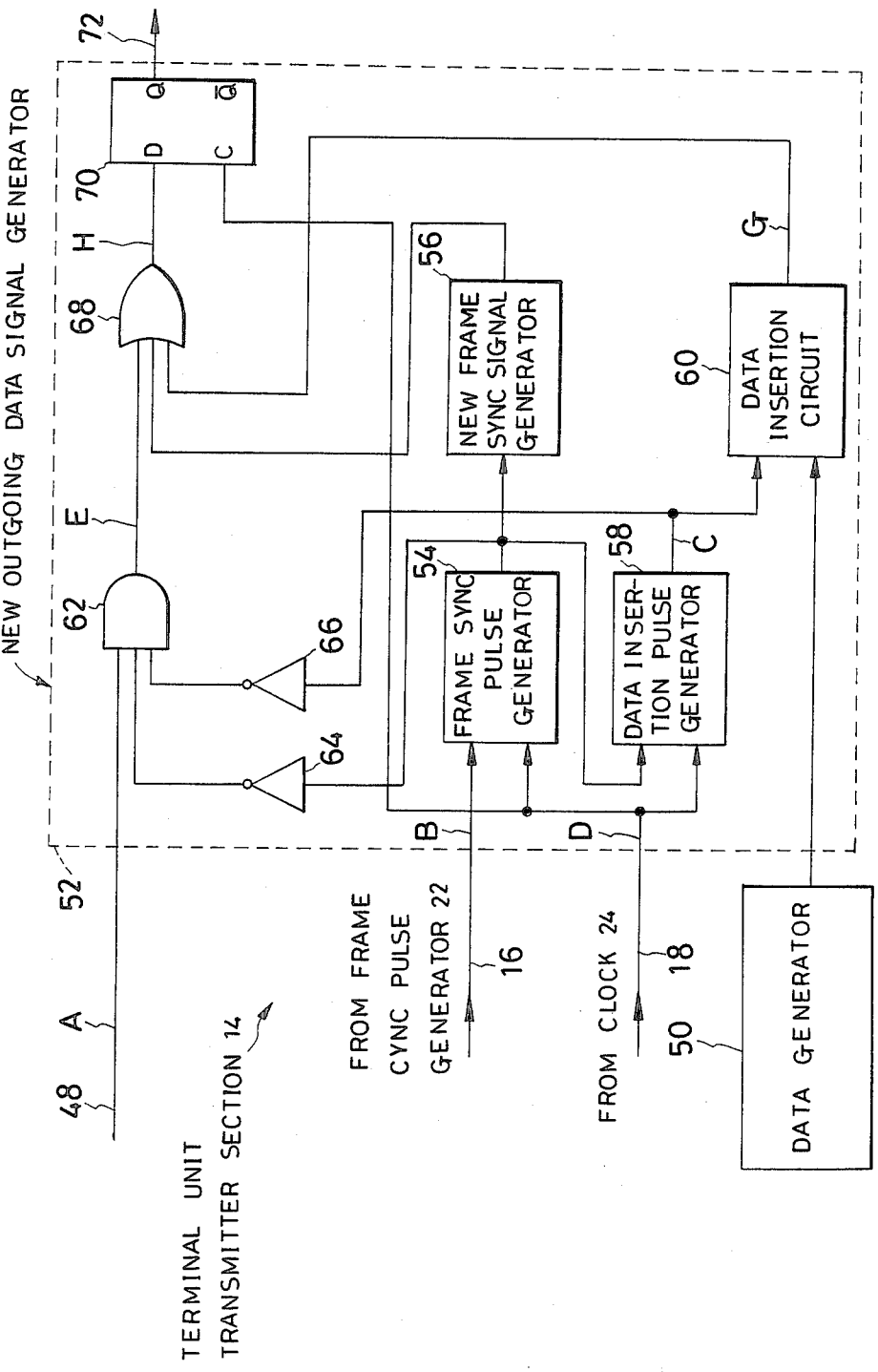
FIG. 5 is a block diagram showing in more detail the transmitter section of each terminal unit of the FIG. 1 system.

We have shown in FIG. 5 the details of the transmitter section 14 of each of the terminal units T.1 through T.N. Let us assume that the particular transmitter section shown here is that of the N−1'th terminal unit T.N−1, in order to expedite the description of its operation. The capitals A through H in this figure denote the parts where the correspondingly designated signals of FIG. 6 appear.

The transmitter section 14 of the N−1'th terminal unit has an input path 48 connected to the transmitter section 14 of the preceding terminal unit T.N, which is farthest away from the switching control circuit 10. The outgoing data signal fed over the input path 48 to the N−1'th terminal unit transmitter section 14 is as represented at (A) in FIG. 6, having only the frame field F, containing the frame sync signal from the preceding terminal unit T.N, and the data field N containing the N'th channel of data generated by the preceding terminal unit.

At 50 is shown a data generator circuit for generating digital outgoing data of the N−1'th channel, to be added to the received outgoing data signal of FIG. 6(A). The digital data generator circuit 50 may typically comprise a telephone transmitter circuit, an analog to digital converter, and a switching control data generator circuit.

The transmitter section 14 further comprises a new outgoing data signal generator circuit 52 connected to the input path 48, the data generator circuit 50, and the frame sync pulse generator circuit 22 and clock 24 of the associated receiver section 12. The new outgoing data signal generator circuit 52 recreates an outgoing data signal of new frame format, given at (H) in FIG. 6, in response to the outgoing data signal received from the transmitter section 14 of the preceding terminal unit T.N. Included in this signal generator circuit 52 are a frame sync pulse generator circuit 54, a new frame sync signal generator circuit 56, a data insertion pulse generator circuit 58, a data insertion circuit 60, an AND gate 62, two inverters 64 and 66, an OR gate 68, and a D flip flop 70.

The frame sync pulse generator circuit 54 has two inputs connected respectively to the frame sync pulse generator circuit 22 and the clock 24 of the associated receiver section 12 by way of the lines 16 and 18. As the receiver section frame sync pulse generator circuit 22 delivers frame sync pulses of FIG. 6(B), as from moment t1 to moment t2 in FIG. 6, the transmitter section frame sync pulse generator circuit 54 responds to each such pulse by putting out, upon lapse of a prescribed length of time, a frame sync pulse having a duration of one frame field and lasting from moment t4 to moment t5 as at (F) in FIG. 6. The prescribed length of time is equal to the sum of the N−1 data fields and one frame field. It will be noted from a comparision of (A) and (F) in FIG. 6 that each frame sync pulse generated by the transmitter section frame sync pulse generator 54 is spaced in time by one data field forwardly of the subsequent N'th channel of data field N.

Connected to the output of the frame sync pulse generator circuit 54, the new frame sync signal generator circuit 56 generates, in synchronism with the frame sync pulses each lasting as for moment t4 to moment t5 of FIG. 6(F), a new frame sync signal for use in the new outgoing data signal in substution for the old frame sync signal which has been contained in the received outgoing data signal of FIG. 6(A). The new frame sync signal is, however, of the same five bit binary number as that of the frame sync signal of the period from moment t6 to moment t7 in the old outgoing data signal of FIG. 6(A). This new frame sync signal generator circuit 56 can take the form of a counter just like the new frame sync signal generator circuit 34, FIG. 3, of the new incoming data signal generator circuit 32 of the terminal unit receiver section 12.

The frame sync pulse generator circuit 54 is further connected to the data insertion pulse generator circuit 58, to which there is also connected the clock 24 of the terminal unit receiver section 12. The data insertion pulses generated by this circuit 58 are as represented at (C) in FIG. 6. Each data insertion pulse has a duration of one data field, lasting from the trailing edge, as at moment t5, of one frame sync pulse of FIG. 6(F) from the transmitter section frame sync pulse generator circuit 54 to the trailing edge, as at moment t7, of the subsequent frame sync pulse of FIG. 6(B) from the receiver section frame sync pulse generator circuit 22. In other words, each data insertion pulse intervenes between one new frame sync pulse of FIG. 6(F) and the subsequent N'th channel of data field N in each frame of the received outgoing data signal. The data insertion pulse generator circuit 58 can be composed of a counter circuit, operating on the same principles as the data extraction pulse generator circuit 26, FIG. 3, of the terminal unit receiver section 12.

The data insertion pulse generator circuit 58 is connected to the data insertion circuit 60, to which there is also connected the digital data generator circuit 50. The data insertion circuit 60 puts out the outgoing data, generated by the circuit 50, in synchronism with the data insertion pulses from the data insertion pulse generator circuit 58. The N−1'th channel of outgoing data thus put out by the data insertion circuit is given at (G) in FIG. 6. This N−1'th channel of outgoing data is to be interposed between the frame field F and the preceding N'th channel of data field N in each frame of the new outgoing data signal to be created as at (H) in FIG. 6.

For the creation of this new outgoing data signal, the the preceding channel or channels (N'th channel in this case) of data must be extracted from the old outgoing data signal received at this (N−1'th) terminal station. Employed as a data extraction circuit directed to this end is the AND gate 62 having three inputs, one connected to the input path 48, another to the frame sync pulse generator circuit 54 via the inverter 64, and still another to the data insertion pulse generator circuit 33 via the inverter 66. The output from this data extraction AND gate 62 is as depicted at (E) in FIG. 5, herein shown to consist of the N'th channel of outgoing data which has been generated by the preceding N'th terminal unit transmitter section 14.

Figure 6:
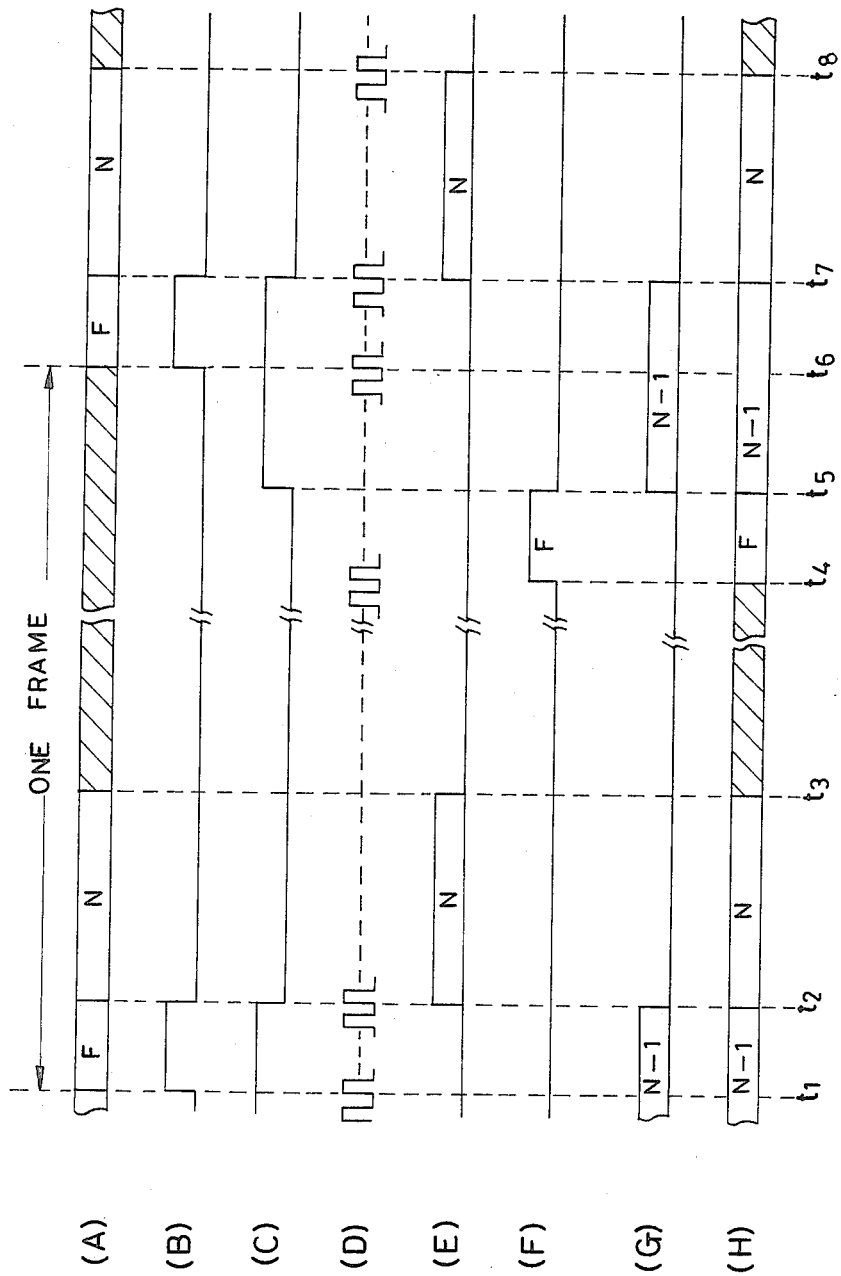
FIG. 6 is a timing diagram showing the signals appearing in the various parts of the transmitter section of FIG. 5.

Connected to the output of the AND gate 62, the OR gate 68 has two other inputs connected respectively to the new frame sync signal generator circuit 56 and to the data insertion circuit 60. The OR gate 68 functions as an addition circuit, combining the signals of (E), (F) and (G) in FIG. 6 to put out the desired outgoing data signal of new frame format given at (H) in FIG. 6. This new outgoing data signal is equivalent to the signal shown at (G) in FIG. 2B, whereas the old outgoing data signal of FIG. 6(A) is equivalent to the signal shown at (F) in FIG. 2B.

The D flip flop 70 is intended to serve as a buffer. It has a data input D connected to the OR gate 68, a clock input C connected to the clock 24, and a Q output connected to an output line 72 leading to the transmitter section of the next terminal unit (omitted in FIG. 1) closer to the switching control circuit 10.

The foregoing constructional and operational description of the transmitter section 14 of the representative terminal unit T.N−1 applies to the transmitter section of each of the other cascaded terminal units T.1, T.2, . . . T.N, except that the input path 48 of the N'th terminal unit T.N has nothing connected thereto, and that the output path 72 of the first terminal unit T.1 is connected directly to the switching control circuit 10. In short, the transmitter section 14 of each terminal unit takes in the outgoing data signal from the preceding unit, recreates an outgoing data signal of new frame format containing its own channel of outgoing data immediately after the frame field of each frame, and delivers this new outgoing data signal to the next terminal unit closer to the switching control circuit 10.

Alternate Embodiment

Figure 7:
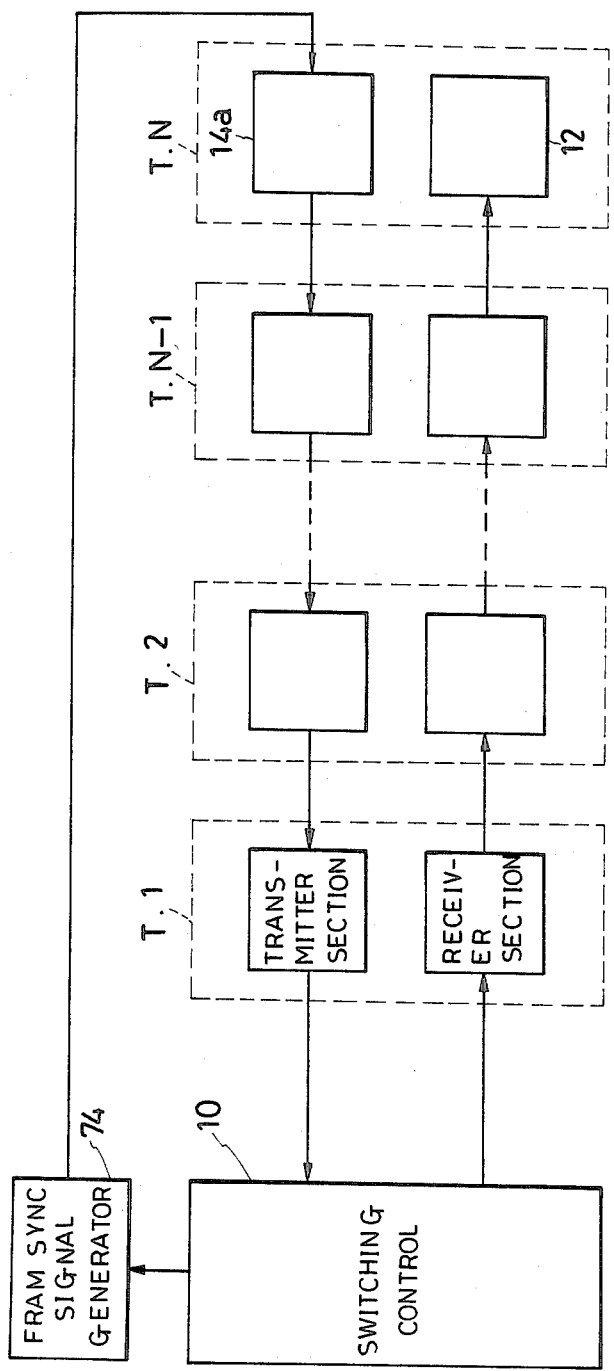
FIG. 7 is a block diagram of an alternative form of key telephone system embodying the principles of our invention.

We have illustrated in FIG. 7 an alternate embodiment of our invention, which in fact is a slight modification of the key telephone system of FIG. 1. The modification resides in a frame sync signal generator circuit 74 having an input connected to the switching control circuit 10 to be controlled thereby, and an output connected to the transmitter section 14a of the N'th terminal unit T.N. The provision of this separate frame sync signal generator circuit 74 makes it unnecessary for the transmitter section 14a of each terminal unit to receive frame sync pulses from the associated receiver section as in the FIG. 1 embodiment.

Figure 8:
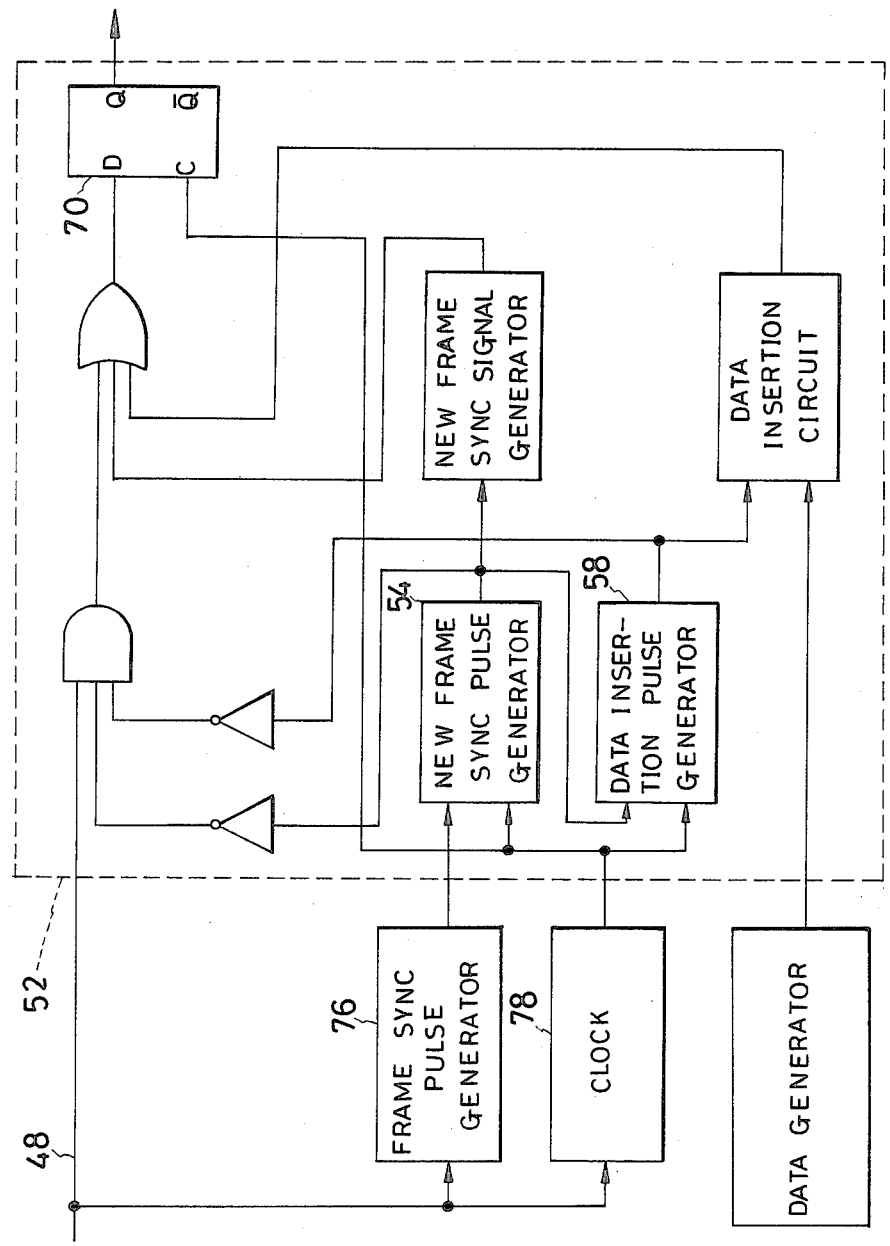
FIG. 8 is a block diagram showing in more detail the transmitter section of each terminal unit of the FIG. 7 system.

FIG. 8 is a detailed illustration of the transmitter section 14a of the N'th terminal unit T.N of the modified system of FIG. 7. The input line 48 of this N'th terminal unit transmitter section 14 is connected to the output of the frame sync signal generator circuit 74. The transmitter section 14a newly incorporates a frame sync pulse generator circuit 76 and a clock 78, both having their inputs connected to the input line 48. The output of the frame sync pulse generator circuit 76 is connected to the new frame sync pulse generator 54 of the new outgoing data signal generator circuit 52. We have so renamed the new frame sync pulse generator circuit 54 by way of contradistinction from the newly incorporated frame sync pulse generator circuit 76; in fact, the new frame sync pulse generator circuit 54 is akin to the frame sync pulse generator circuit 54, FIG. 5, of the preceding embodiment. The output of the clock 78 is connected to the new frame sync pulse generator circuit 54, data insertion pulse generator circuit 58, and the clock input of the flip flop 70, which are all included in the new outgoing data signal generator circuit 52. This new outgoing data signal generator circuit is identical with that of the preceding embodiment.

In the modified transmitter section 14a configured as in the foregoing, the frame sync pulse generator circuit 76 performs a function similar to the receiver section frame sync pulse generator circuit 22, FIG. 3, of the preceding embodiment, generating the frame sync pulses of FIG. 6(B) in synchronism with the frame fields of the outgoing data signal. The clock 78 also performs the same function as the clock 24, FIG. 3, of the preceding embodiment, generating clock pulses as at (D) in FIG. 6. It is therefore self evident that the new outgoing data signal generator circuit 52 of this modified transmitter section operates the same way as that of FIG. 5.

Possible Modifications

Although we have shown and described our invention in terms of but two preferable embodiments thereof, we recognize, of course, that our invention could be embodied in other forms within the broad teaching hereof. The following, then, is a brief list of possible modifications, alterations and adaptations of the above disclosed embodiments which we believe fall within the scope of our invention:

1. The clock pulses given at (D) in FIG. 4 and at (D) in FIG. 6 could be derived from the frame sync signal or from the frame sync pulses shown at (B) in FIG. 4 and at (B) in FIG. 6.

2. The new incoming data signal and the new outgoing data signal could be created by means other than the respective circuits 32 and 52 of FIGS. 3 and 5. For example, the old incoming or outgoing data signal may be converted from serial to parallel bit form. This bit parallel data signal may then be written into a memory, and the stored data may be read out with such timings as to realize the required rearrangement of the various channels of data. Then the rearranged channels of data may be reconverted into serial format for delivery to the next terminal unit.

3. Instead of delivering to the AND gate 40, FIG. 3, of the new incoming data signal generator circuit 32 of each terminal unit receiver section 12 the outputs from the frame sync pulse generator circuit 22 and the data extraction pulse generator circuit 26 via the inverters 36 and 38, there might be first created an addition of the frame sync pulses and data extraction pulses. Then the addition signal might be inverted and fed to the AND gate 40 together with the old incoming data signal from the input line 20.

4. Similarly, in the new outgoing data signal generator circuit 52, FIG. 5, of each terminal unit transmitter section 14, there might be first created an addition of the frame sync pulses and data insertion pulses. This addition signal might then be inverted and impressed to the AND gate 62 along with the old outgoing data signal from the input line 48.

5. The frame sync signals need not be of five bit binary numbers but may, for example, be in the form of pulses such as the frame sync pulses of FIG. 4(B) or 6(F).

6. The transmitter section 14 of only the N'th terminal unit T.N might be made different in circuit configuration from those of the other terminal units, for the generation of the initial outgoing data signal of FIGS. 2B(F) or 6(A).

7. Contrary to the showings of FIGS. 2A and 2B there might be provided a time spacing between each frame field of the incoming or outgoing data signal and the subsequent data field.

8. Also, in each frame of the incoming or outgoing data signal, the first to N'th channels of data might be arranged in the reversal of the order shown.

9. The frame sync signal generator circuit 34, FIG. 3, of the new incoming data signal generator circuit 32 of each terminal unit and the frame sync signal generator circuit 56, FIG. 5, of the new outgoing data signal generator circuit 52 of the same terminal unit might share a counter.

10. The data extraction pulse generator circuit 26, FIG. 3, of each terminal unit receiver section 12 and the data insertion pulse generator circuit 58, FIG. 5, of each terminal unit transmitter section 14 could each take the form of a monostable multivibrator.

11. Instead of wholly extracting each channel of data from the incoming data signal by the AND gate 28, FIG. 3, of each terminal unit receiver section 12, the message data and control data contained in each data channel might be extracted separately.

12 Each data field of the outgoing and incoming data signals might contain message data only, control data only, or a combination of such data, with or without additional data.

13. Each frame of the outgoing and incoming data signals might contain a field or fields in addition to the frame field and the data fields.

14. A central processor unit might be employed in place of some or all of the data receiver circuit 30, data generator circuit 50, new incoming data signal generator circuit 32, and new outgoing data signal generator circuit 52 of each terminal unit.

15. The invention might be adapted for facsimile, data communications, and any other type of telecommunications, regardless of the matter conveyed and the distances covered.

We claim:

1. A time division multiplex telecommunications system comprising:
 (a) a source of a data signal of time division multiplex frame format having a succession of frames of a frame sync signal and at least first and second channels of data arranged in predetermined time relationship to one another;
 (b) a first terminal unit connected to the source for inputting the data signal therefrom, the first terminal unit comprising:
  (1) means for accepting the first channel of data contained in each frame of the data signal; and
  (2) means for rearranging the time relationship between the frame sync signal and the second channel of data in each frame of the data signal and for putting out a second data signal of new frame format wherein the time relationship between the frame sync signal and the second channel of data in each frame is the same as the time relationship between the frame sync signal and the first channel of data in each frame of the first recited data signal supplied from the source; and
 (c) a second terminal unit connected in tandem to the first terminal unit for inputting the second data signal therefrom, the second terminal unit comprising:
  (1) means for accepting the second channel of data contained in each frame of the second data signal from the first terminal unit;
 (d) wherein the second terminal unit further comprises:
  (1) data generator means for generating a second channel of outgoing data;
  (2) outgoing data signal generator means connected to the data generator means for generating a first outgoing data signal having a succession of frames of an outgoing frame sync signal and the second channel of outgoing data arranged in predetermined time relationship to each other; and
  (3) output means connected to the outgoing data signal generator means for putting out the first outgoing data signal;
 and wherein the first terminal unit further comprises:
  (4) input means connected to the output means of the second terminal unit for inputting the first outgoing data signal therefrom;
  (5) data generator means for generating a first channel of outgoing data;
  (6) outgoing data signal generator means connected to both the input means and the data generator means of the first terminal unit for generating a second outgoing data signal of time division multiplex form by adding the first channel of outgoing data to each frame of the first outgoing data signal, the time relationship between the outgoing frame sync signal and the first channel of outgoing data in each frame of the second outgoing data signal being the same as the time relationship between the outgoing frame sync signal and the second channel of outgoing data in each frame of the first outgoing data signal; and
  (7) output means connected to the outgoing data signal generator means of the first terminal unit for putting out the second outgoing data signal.

2. A time division multiplex telecommunications system for the transmission and reception of data, comprising:
 (a) a control circuit for the transmission of an incoming data signal and the reception of an outgoing data signal, each of the incoming and outgoing data signals being of time division multiplex frame format having a succession of frames each comprising a frame field, assigned to a frame sync signal, and N data fields assigned to N channels of data, where N is an integer of not less than two, the frame sync signal and the N channels of data in each frame being arranged in predetermined time relationship to one another;
 (b) M terminal units, where M is an integer of not more than N, connected in cascade to the control circuit and each preassigned to a particular one of the N channels for the transmission and reception of data, each terminal unit comprising:
  (1) receiver means for receiving the incoming data signal from the control circuit or from the receiver means of the preceding terminal unit closer to the control circuit, the receiver means extracting the preassigned channel of data from the associated data field in each frame of the received incoming data signal and producing a new incoming data signal for delivery to the receiver means of the next terminal unit away from the control circuit, the new incoming data signal being such that the time relationship in each frame between the frame sync signal and the channel of data preassigned to that next terminal unit is the same as the time relationship in each frame of the receiving incoming data signal between the frame sync signal and the channel of data that has been extracted by the terminal unit under consideration; and
  (2) transmitter means for transmitting an outgoing data signal from the transmitter means of the preceding terminal unit away from the control circuit and for generating data to be transmitted, the transmitter means putting out a new outgoing data signal, for delivery to the control circuit or to the transmitter means of the next terminal unit closer to the control circuit, by adding the generated data to each frame of the outgoing data signal received from the transmitter means of the preceding terminal unit away from the control circuit, the new outgoing data signal being such that the time relationship between the frame sync signal and the added data in each frame is the same as the time relationship, in each frame of the outgoing data signal received from the transmitter means of the preceding terminal unit, between the frame sync signal and the data generated by that preceding terminal unit.

3. The time division multiplex telecommunications system of claim 2 wherein the receiver means of each terminal unit comprises:

(a) input means for receiving the incoming data signal;

(b) output means for putting out the new incoming data signal;

(c) a frame sync pulse generator circuit connected to the input means and responsive to the frame sync signal contained in each frame of the received incming data signal for generating frame sync pulses in synchronism with the frame fields of the received incoming data signal;

(d) a source of clock pulses;

(e) a data extraction pulse generator circuit connected to both the frame sync pulse generator circuit and the source of clock pulses for generating a data extraction pulse in synchronism with that data field in each frame of the received incoming data signal which is preassigned to the terminal unit under consideration;

(f) a data extraction circuit connected to both the input means and the data extraction pulse generator circuit for extracting the data from that data field in each frame of the received incoming data signal which is preassigned to the terminal unit under consideration;

(g) a data receiver circuit connected to the data extraction circuit for processing the extracted data; and (h) a new incoming data signal generator circuit connected to all of the input means, the frame sync pulse generator circuit, the source of clock pulses and the data extraction pulse generator circuit, and further connected to the output means, for generating the new incoming data signal by removing the data from that data field in each frame of the received incoming data signal which is preassigned to the terminal unit under consideration.

4. The time division multiplex telecommunications system of claim 3 wherein the transmitter means of each terminal unit comprises:

(a) second input means for receiving the outgoing data signal;

(b) second output means for putting out the new outgoing data signal;

(c) a data generator circuit for digitally generating outgoing data; and (d) a new outgoing data signal generator circuit connected to all of the second input means, the data generator circuit, and the frame sync pulse generator circuit and clock pulse source of the receiver means of the same terminal unit, and further connected to the second output means, for generating the new outgoing data signal by combining the outgoing data generated by the data generator circuit and the frame sync signal generated in response to the frame sync pulses from the frame sync pulse generator.

5. The time division multiplex telecommunications system of claim 3 wherein the new incoming data signal generator circuit of the receiver means of each terminal unit comprises:

(a) a new frame sync signal pulse generator circuit connected to both the frame sync pulse generator circuit and the clock pulse source for generating a new frame sync signal for use in the new incoming data signal in substitution for the old frame sync signal which has been contained in the received incoming data signal, the new frame sync signal in the predetermined time relationship to that data field of the received incoming data signal which is preassigned to the next channel;

(b) a data removal circuit connected to all of the input means, the frame sync pulse generator circuit and the data extraction pulse generator circuit for removing from the received incoming data signal both the data of the channel preassigned to the terminal unit under consideration and the old frame sync signal; and (c) an addition circuit connected to both the new frame sync signal generator circuit and the data removal circuit for generating the new incoming data signal by combining the new frame sync signal generated by the new frame sync signal generator and the removed data signal generated by the data removal circuit.

6. The time division multiplex telecommunications system of claim 4 wherein the new outgoing data signal generator circuit of the transmitter means of each terminal unit comprises:

(a) a second frame sync pulse generator circuit connected to both the first recited frame sync pulse generator circuit and clock pulse source of the receiver means of the same terminal unit for generating frame sync pulses each having a duration equal to the length of one frame field and each spaced in time by the length of one data field forwardly from that data field of the received outgoing data signal which is preassigned to the preceding terminal unit farther away from the control circuit;

(b) a new frame sync signal generator circuit connected to the second frame sync pulse generator circuit for generating, in synchronism with the frame sync pulses received therefrom, a new frame sync signal for use in the new outgoing data signal in substitution for the old frame sync signal which has been contained in the received outgoing data signal;

(c) a data insertion pulse generator circuit connected to both the second frame sync pulse generator circuit and the clock pulse source of the receiver means of the same terminal unit for generating data insertion pulses each lasting between one frame sync pulse from the second frame sync pulse generator circuit and that data field of the received outgoing data signal which is preassigned to the preceding terminal unit farther away from the control circuit;

(d) a data extraction circuit connected to all of the second input means, the second frame sync pulse generator circuit and the data insertion pulse generator circuit for extracting from the received outgoing data signal the data of the preceding channel or channels that have been contained therein;

(e) a data insertion circuit connected to both the data generator circuit and the data insertion pulse generator circuit for putting out the outgoing data from the data generator circuit in synchronism with the data insertion pulses from the data insertion pulse generator circuit; and (f) an addition circuit connected to all of the data extraction circuit, the new frame sync signal generator circuit and the data insertion circuit for generating the new outgoing data signal by combining the outputs therefrom, the addition circuit being further connected to the second output means for the delivery of the new outgoing data signal to the control circuit or to the transmitter means of the next terminal unit closer to the control circuit.

7. The time division multiplex telecommunications system of claim 2 further comprising a frame sync signal generator circuit for generating the frame sync signal, the frame sync signal generator circuit being connected to the transmitter means of that one of the M terminal units which is farthest away from the control circuit, the transmitter means of said farthest terminal unit generating the new outgoing data signal in response to the frame sync signal fed from the frame sync signal generator circuit.

8. The time division multiplex telecommunications system of claim 2 wherein the terminal units are key telephone sets.

9. A time division multiplex telecommunications method for the transmission of data to at least first and second terminal stations in tandem connection with each other, as adapted for the transmision of first and second channels of outgoing data from the first and second terminal stations, respectively, which method comprises:

(a) transmitting to the first terminal station a data signal of time division multiplex frame format having a succession of frames of a frame sync signal and at least first and second channels of data arranged in predetermined time relationship to one another;

(b) accepting, at the first terminal station, the first channel of data contained in each frame of the data signal;

(c) rearranging, at the first terminal station, the time relationship between the frame sync signal and the second channel of data in each frame of the data signal to provide a second data signal of new frame format wherein the time relationship between the frame sync signal and the second channel of data in each frame is the same as the time relationship between the frame sync signal and the first channel of data in each frame of the first recited data signal which has been transmitted to the first terminal station;

(d) transmitting the second data signal from the first to the second terminal station;

(e) accepting, at the second terminal station, the second channel of data contained in each frame of the second data signal;

(f) generating the second channel of outgoing data at the second terminal station;

(g) further generating at the second terminal station a first outgoing data signal of time division multiplex frame format having a succession of frames of an outgoing frame sync signal and the second channel of outgoing data in predetermined time relationship to each other;

(h) transmitting the first outgoing data signal from the second to the first terminal station;

(i) generating the first channel of outgoing data at the first terminal station;

(j) further generating at the first terminal station a second outgoing data signal of new frame format by adding the first channel of outgoing data to the received first outgoing data signal, the second outgoing data signal being such that the time relationship between the outgoing frame sync signal and the first channel of outgoing data in each frame is the same as the time relationship between the outgoing frame sync signal and the second channel of outgoing data in each frame of the received first outgoing data signal; and (k) transmitting the second outgoing data signal from the first terminal station.

* * * * *